D. E. BANGS.
AIR-PUMP.

No. 182,298. Patented Sept. 19, 1876.

WITNESSES
J. S. Tucker
W. S. Hill.

INVENTOR
David E Bangs

UNITED STATES PATENT OFFICE.

DAVID E. BANGS, OF MEDFORD, MASSACHUSETTS.

IMPROVEMENT IN AIR-PUMPS.

Specification forming part of Letters Patent No. 182,298, dated September 19, 1876; application filed April 1, 1876.

*To all whom it may concern:*

Be it known that I, DAVID E. BANGS, of Medford, in the county of Middlesex, and State of Massachusetts, have invented certain Improvements in Air-Pumps, of which the following is a specification:

This invention relates to certain improvements in air-pumps, whereby a constant and even pressure of air may be maintained by the reciprocating motion of a piston operating within a cylinder, the piston being provided with a casing of rubber cloth or other material impermeable by air, and also attached to the bottom of the cylinder, thus forming a bellows, of which the piston is one head, and is fastened to the piston-rod, which works through a stuffing-box. Thus, on one motion of the piston, the air is driven from within the bellows, through the outlet-valve, at the same time air is drawn into the cylinder above the piston, through the inlet-valve, at the top of the cylinder, it being in turn driven out by the upward motion of the piston.

The advantage of this arrangement is that the use of packing between the piston and the cylinder is obviated. A constant and unvarying motion is given to the piston-rod, by means of two gears driven by one common gear, which is attached to the windlass. To said gear are attached segments, working into toothed racks on the piston-rod, and so arranged that, while one of the segments is engaged with the rack, an upward motion will be communicated to the rod, and while the other is engaged with its rack a downward motion will be given.

The leaving ends of the segments are provided with projections which engage with lugs attached to the side of the rack, and so arranged that one segment shall become disengaged from the rack at very nearly the moment of contact with the other segment, thus insuring a constant and unvarying motion.

Figure 1:
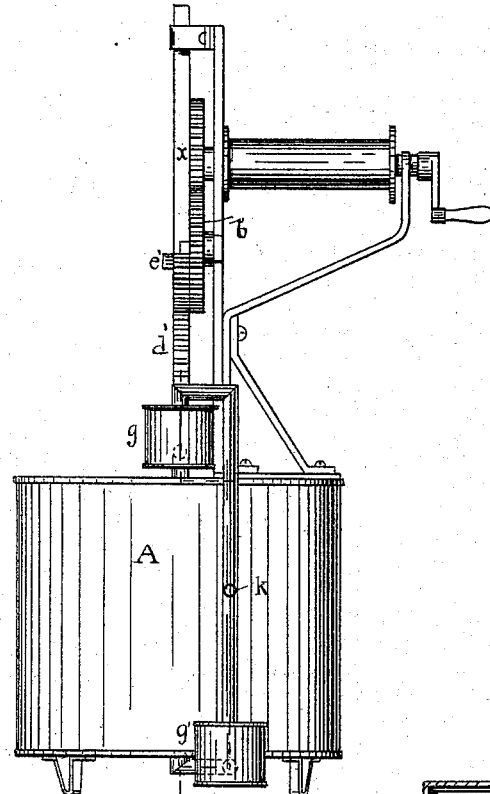
Figure 2:
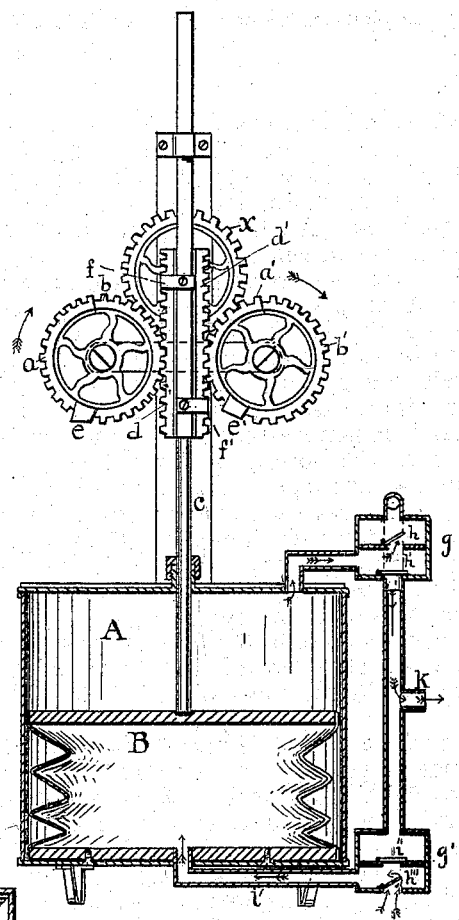
Figure 3:
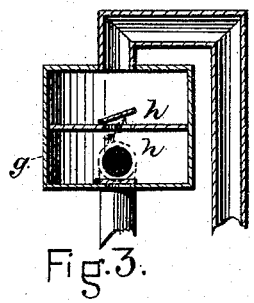

In the drawing, Figure 1 shows a side view of my invention. Fig. 2 is a front and sectional view.

A is the cylinder. B is the bellows, and $g$ and $g'$ the valve-boxes, shown in section. At $a\ a'$ are shown the segments, attached to geared wheels $b\ b'$. $c$ is the piston-rod, with toothed racks at $d\ d'$. $e\ e'$ are the projections that engage with lugs $f f'$.

The geared wheel $x$ is attached to the shaft of the windlass, and communicates its motion to the wheels $b\ b'$. $g\ g'$ are the boxes containing valves $h'\ h''\ h'''\ h''''$. To put the machine in operation, motion is given to the windlass by a weight and cord, or any other suitable means.

The wheels $b\ b'$ will move in the direction indicated by the arrows. The segment $a'$ being in connection with the rack $d'$ an upward motion will be given to the piston-rod $c$. At the upper extremity of the stroke the projection $e'$ will bear against the lug $f'$, and is adjusted so as to leave the lug just before the segment $a$ engages with the rack $d'$, and the down-stroke begins, the projection $e$ operating with lug $f$ the same as $e$ and $f$ on the upstroke.

On the upstroke of the piston the air in the cylinder will be driven through the delivery-pipe $k$. At the same time air will be drawn into the bellows through the valve $h'''$ and pipe $i'$. On the downstroke the air will be driven from the bellows, through the valve $h''$, while air will be drawn into the cylinder through the valve $h'$.

Each valve-box contains an inlet and outlet valve. By this arrangement the air may be taken into and driven out of the cylinder through the same pipe.

Having thus fully described my invention, what I claim as new, and desire to secure by Letters Patent, is—

1. The bellows B, operating in combination with covered cylinder A, and valves $h'\ h''\ h'''\ h''''$, to produce a constant current of air, as specified.

2. The segments $a\ a'$, with projections $e\ e'$, in combination with the geared wheels $b\ b'$, toothed racks $d\ d'$, with lugs $f f'$, operating to impart a constant reciprocating motion to the rod $c$, as described and specified.

3. The valve-boxes $g\ g'$, with inlet-valves $h'\ h'''$, outlet-valves $h\ h''$, operating in combination with the covered cylinder A, in the manner and for the purpose specified.

DAVID E. BANGS.

Witnesses:
J. S. TUCKER,
W. S. HILL.